(12) United States Patent
Huwe et al.

(10) Patent No.: US 11,360,258 B1
(45) Date of Patent: Jun. 14, 2022

(54) ILLUMINATED INPUT DEVICES

(71) Applicant: Apple Inc., Cupertino, CA (US)

(72) Inventors: Ethan L. Huwe, Perham, MN (US);
Glenn K. Trainer, San Francisco, CA (US); Jun Qi, Cupertino, CA (US);
Rong Liu, Sunnyvale, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 15/170,748

(22) Filed: Jun. 1, 2016

(51) Int. Cl.
| | |
|---|---|
| *F21V 8/00* | (2006.01) |
| *G02B 27/30* | (2006.01) |
| *F21V 23/04* | (2006.01) |
| *F21V 17/10* | (2006.01) |
| *F21Y 101/02* | (2006.01) |

(52) U.S. Cl.
CPC ............ *G02B 6/006* (2013.01); *F21V 17/101* (2013.01); *F21V 23/0485* (2013.01); *G02B 6/0036* (2013.01); *G02B 6/0046* (2013.01); *G02B 6/0051* (2013.01); *G02B 6/0055* (2013.01); *G02B 27/30* (2013.01); *F21Y 2101/02* (2013.01)

(58) Field of Classification Search
CPC .... G02B 6/006; G02B 6/0036; G02B 6/0046; G02B 6/0051; G02B 6/0055; G02B 27/30; F21V 17/101; F21V 23/0485
USPC ...................................................... 362/23.12
See application file for complete search history.

(56) References Cited

U.S. PATENT DOCUMENTS

| | | | | |
|---|---|---|---|---|
| 5,095,409 A | * | 3/1992 | Dematteo | H01H 9/161 116/286 |
| 5,736,233 A | * | 4/1998 | Fye | B32B 38/10 101/491 |
| 6,481,130 B1 | * | 11/2002 | Wu | F21V 13/04 362/297 |
| 7,048,427 B2 | * | 5/2006 | Fujino | G02B 6/0036 349/65 |
| 8,297,675 B2 | * | 10/2012 | Someschan | B60R 13/02 264/46.5 |
| 8,570,298 B2 | * | 10/2013 | Ikeda | G06F 3/0446 345/174 |
| 8,835,785 B2 | * | 9/2014 | Yamada | H01H 13/83 200/310 |
| 8,995,807 B1 | * | 3/2015 | Jalava | G02B 6/34 385/37 |
| 9,103,950 B2 | * | 8/2015 | Nishitani | G02B 6/0028 |
| 9,297,675 B2 | * | 3/2016 | Keranen | G01D 11/28 |

(Continued)

*Primary Examiner* — Arman B Fallahkhair
(74) *Attorney, Agent, or Firm* — Treyz Law Group, P.C.; G. Victor Treyz; Kendall P. Woodruff

(57) ABSTRACT

An electronic device may have input-output devices such as buttons formed from capacitive touch sensor electrodes. A transparent layer may be provided with opaque masking structures having a symbol-shaped opening aligned with a capacitive touch sensor electrode for a button or other input device. The symbol-shaped opening may be adjacent to the electrode and may be illuminated with light from a lighting system. The lighting system may include a light guide plate. The light guide plate may have edges that are oriented at non-zero angle with respect to each other. Light-emitting diodes of different colors may emit light into the edges. The light may be extracted from the light guide plate using bumps in a light extraction region. Light may be collimated using ribs formed on an opposing side of the light guide plate.

20 Claims, 9 Drawing Sheets

(56) References Cited

U.S. PATENT DOCUMENTS

| | | | | |
|---|---|---|---|---|
| 9,651,729 B2* | 5/2017 | Nichol | ................ | G02B 6/0036 |
| 9,784,977 B2* | 10/2017 | Takeda | ............... | G02B 27/0172 |
| 9,846,505 B2* | 12/2017 | Ficner | .................... | G06F 3/045 |
| 9,910,211 B2* | 3/2018 | Kloeppel | ............. | G02B 6/0055 |
| 2006/0104092 A1* | 5/2006 | Feng | .................... | G02B 6/0038 |
| | | | | 362/626 |
| 2006/0181903 A1 | 8/2006 | Okuwaki | | |
| 2006/0187676 A1* | 8/2006 | Ishikura | ............. | G02B 6/0018 |
| | | | | 362/615 |
| 2010/0026632 A1* | 2/2010 | Ishida | .................... | H04M 1/22 |
| | | | | 345/170 |
| 2011/0141765 A1* | 6/2011 | Chang | .................... | G02B 5/045 |
| | | | | 362/606 |
| 2012/0176320 A1* | 7/2012 | Burrell, IV | ........... | G06F 1/1664 |
| | | | | 345/168 |
| 2012/0235891 A1 | 9/2012 | Nishitani et al. | | |
| 2013/0229356 A1* | 9/2013 | Marwah | ................ | G06F 1/1616 |
| | | | | 345/170 |
| 2013/0322111 A1 | 12/2013 | Nishitani et al. | | |
| 2014/0049983 A1* | 2/2014 | Nichol | ................ | G02B 6/0018 |
| | | | | 362/610 |
| 2014/0226361 A1* | 8/2014 | Vasylyev | ............. | G02B 6/0025 |
| | | | | 362/606 |
| 2015/0084865 A1* | 3/2015 | Shaw | ....................... | G06F 3/021 |
| | | | | 345/158 |
| 2015/0205035 A1* | 7/2015 | Border | ............... | G02B 27/0172 |
| | | | | 362/19 |
| 2019/0034020 A1* | 1/2019 | He | ..................... | G02F 1/13338 |

* cited by examiner

ILLUMINATED INPUT DEVICES

FIELD

This relates generally to electronic devices and, more particularly, to electronic devices with illuminated input devices.

BACKGROUND

Electronic devices often include input devices such as buttons. It may be desirable to illuminate a button. For example, it may be desirable to illuminate a button so that a user may view the button clearly in low lighting conditions.

It can be challenging to light buttons in electronic devices. If care is not taken, illuminated buttons may be overly bulky or may be inadequately illuminated.

SUMMARY

An electronic device may be provided with a housing. The device may include control circuitry and input-output devices mounted in the housing.

The input-output devices may include input devices such as buttons. Buttons may be formed from capacitive touch sensor electrodes and other components that receive input from a user. An electronic device may have buttons, other input-output devices, and other structures that are provided with illuminated symbols. Illuminated symbols may serve as labels and may provide output such as status information to a user.

A portion of the housing of the electronic device or other structures in the device may include a transparent layer. The transparent layer may be provided with opaque masking structures having a symbol-shaped opening. The symbol-shaped opening may be illuminated to form the illuminated symbol.

The symbol-shaped opening may be aligned with a capacitive touch sensor electrode for a button or other input device. The symbol-shaped opening may be adjacent to the electrode and may be illuminated with light from a lighting system. The lighting system may include a light guide plate.

The light guide plate of the lighting system may have peripheral edges that are oriented at a non-zero angle with respect to each other. Light-emitting diodes of different colors may emit light into the edges. The light may be extracted from the light guide plate using bumps in a light extraction region. Light may be collimated using ribs formed on an opposing side of the light guide plate.

The light guide plate may have a light recycling retroreflector formed from a pair of angled peripheral edges. Light from the retroreflector may be reflected towards the light extraction region.

A printed circuit board may serve as a substrate for capacitive touch sensor electrodes. The light guide plate may scatter light through an opening in the printed circuit board.

DETAILED DESCRIPTION

Figure 1:
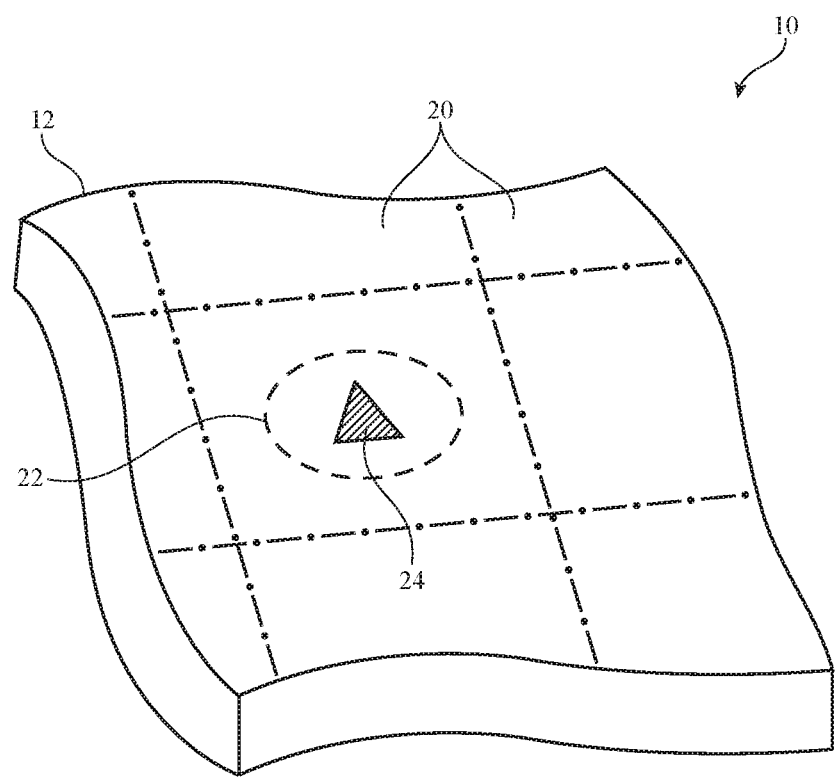
FIG. 1 is a perspective view of a portion of an illustrative electronic device having an illuminated input device in accordance with an embodiment.

Electronic devices may be provided with input-output devices. A perspective view of a portion of an electronic device with an input-output device is shown in FIG. 1. As shown in FIG. 1, device 10 may include a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a computer display that does not contain an embedded computer, speakers and other audio equipment, a computer display that includes an embedded computer, a gaming device, a navigation device, a television, an embedded system such as a system in which electronic equipment with a display is mounted in a kiosk or automobile, equipment that implements the functionality of two or more of these devices, or other electronic equipment.

Device 10 may have input-output devices. A microphone may gather voice input from a user and other audio input. Audio output may be provided to the user with speakers. Visual output may be provided using a display and/or status indicator lights. Buttons, keys, force sensors, touch sensors (e.g., capacitive touch sensors), proximity sensors, and other devices may gather user input (e.g., from a user's finger or other external object such as a stylus). Environmental sensors may be used to gather information on ambient light levels, temperature, humidity, magnetic fields, and other environmental parameters. Accelerometers may gather information on device movement and/or orientation. Device 10 may have input-output devices such these and/or may include any other suitable type of input-output components.

In the illustrative example of FIG. 1, the surface of device 10 that is shown in FIG. 1 has a capacitive touch sensor button (button 22). Button 22 may receive input over a circular area (as shown by the circular dashed line of FIG. 1), over a rectangular input area (see, e.g., the rectangular dashed lines surrounding button 22 of FIG. 1, or other suitable input area. An illuminated (backlit) symbol such as symbol 24 may serve as a label for button 22, may serve as a label for other input devices in device 10, may serve as a status indicator light (e.g., a power indicator, a charge status indicator, a wireless signal strength indicator, a wireless connectivity indicator, a mute indicator, a volume indicator, or other suitable status indicator), may have the shape of a trademark or other icon, or may provide other visual output functions for device 10. Symbol 24 may contain an icon, text, a single alphanumeric character or set of characters, or other information that is associated with the function of button 22, may have a pattern that serves as a label, or may have any other suitable pattern. The triangular pattern of symbol 24 that is shown on FIG. 1 is merely illustrative.

Buttons such as button 22 of FIG. 1 may be arranged in an array to form keys in a keyboard or key pad or may be used as stand-alone buttons (e.g., as power buttons, buttons for controlling media playback such as play, pause, forward, and rewind buttons, volume buttons, or as buttons for other functions).

Buttons such as button 22 may have switches that are controlled by applying pressure from a finger or other external object, may have force sensors that receive input, and/or may have other suitable input components for receiving user input. As an example, buttons such as button 22 may also be capacitive buttons (buttons that detect input from a user by processing capacitance measurements from capacitor electrode structures). In the illustrative configuration of FIG. 1, button 22 has a capacitive electrode that serves both as an individually controllable button that a user may press with the user's finger and that serves as an element in an array of capacitive touch sensor electrodes (i.e., electrodes 20). With this type of arrangement, a user may supply touch input to the surface of device 10 that contains the array of electrodes 20. Touch sensor circuitry that is coupled to the array of electrodes may monitor the array for capacitance changes that are indicative of user touch input (e.g., taps, swipes, multi-touch gestures, etc.). When a user touches the electrode 20 that is associated by button 22, the touch sensor circuitry can register a button press event (i.e., control circuitry in device 10 will detect that the user has pressed button 22).

In general, device 10 may use illuminated symbols such as illuminated symbol 24 for any suitable purpose (e.g., labeling a button, providing a user with information about the operation of other input devices, providing a user with visual feedback, informing a user about the proper operation of device 10, etc. The use of symbol 24 as a label for a capacitive button that is located within an array of capacitive touch sensor electrodes is presented as an example.

Figure 2:
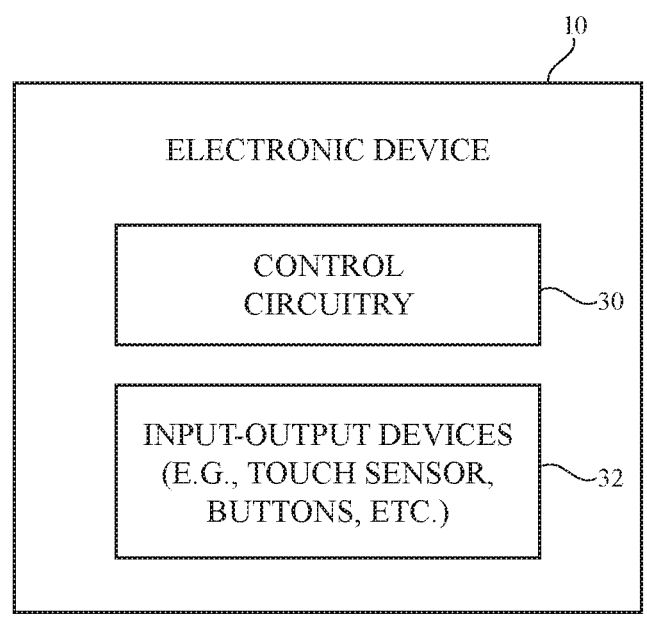
FIG. 2 is a schematic diagram of an illustrative electronic device of the type that may have one or more illuminated symbols for input-output devices or other structures in the electronic device in accordance with an embodiment.

FIG. 2 is a schematic diagram of device 10. As shown in FIG. 2, electronic device 10 may have control circuitry 30.

Control circuitry 30 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 30 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 32 may be used to allow data to be supplied to device 10 and to allow data to be provided from device 10 to external devices. Input-output devices 32 may include illuminated input-output devices such as illustrative button 22 of FIG. 1, other buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, etc.), light-emitting diodes and other status indicators, data ports, etc. A user can control the operation of device 10 by supplying commands through input-output devices 32 and may receive status information and other output from device 10 using the output resources of input-output devices 32. Input-output devices 32 may include one or more displays and other components for providing visual information. Illuminated symbols such as illuminated symbol 24 of FIG. 1 may be provided on devices 32, may be provided adjacent to devices 32, or may be provided elsewhere in device 10 (e.g., elsewhere on housing 12).

Control circuitry 30 may be used to run software on device 10 such as operating system code and applications. During operation of device 10, the software running on control circuitry 30 may gather user input from buttons such as button 22 and other input-output devices 32, may gather information from environmental sensors, and may gather other input and, may, in response, take appropriate action (e.g., device 10 may play media to a user, display information on a display or other visual output device, send messages electronically, retrieve information from the internet and present the retrieved information to a user visually and/or audibly, etc.).

Figure 3:
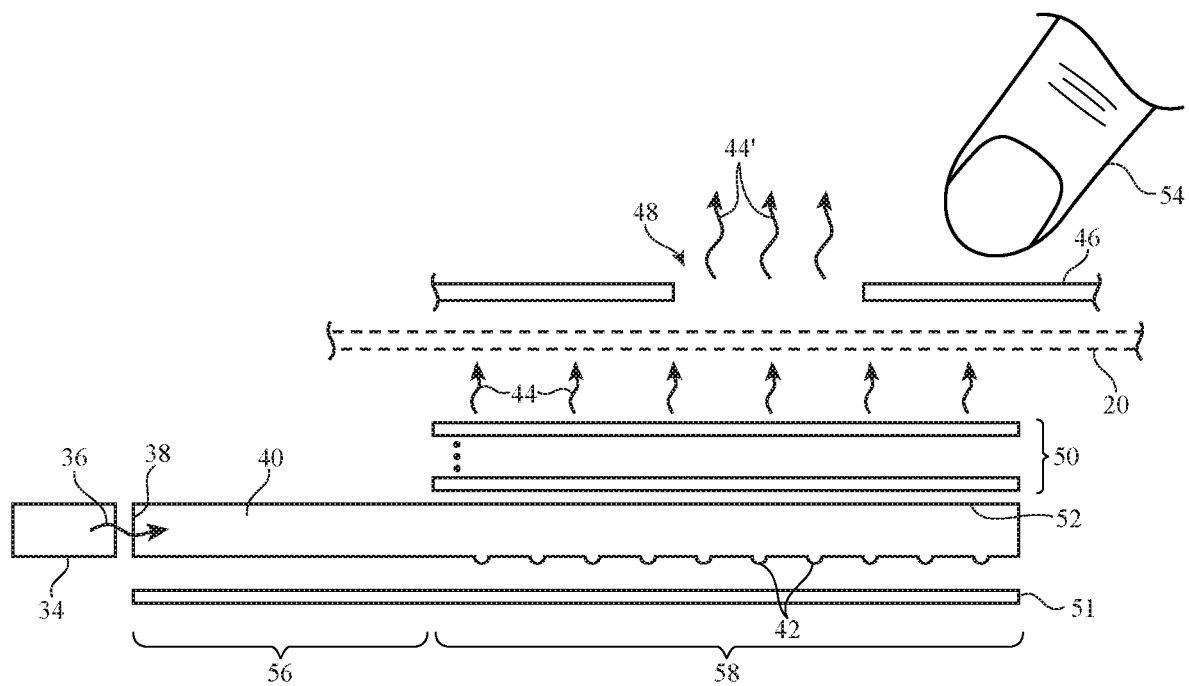
FIGS. 3 and 4 are cross-sectional side views of illustrative illumination systems for input-output devices in accordance with an embodiment.
Figure 4:
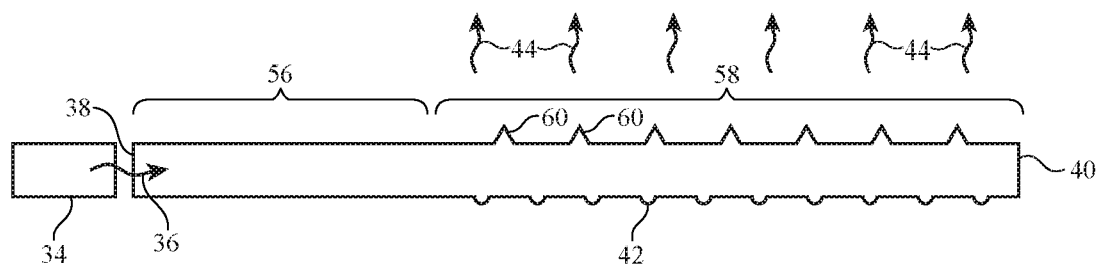

FIGS. 3 and 4 are cross-sectional side views of illustrative illumination systems of the type that may be used to illuminate symbol 24 of FIG. 1 or other suitable symbols or structures in device 10. The illuminated symbols may be associated with input-output devices 32 or may be used for other labeling in device 10. As an example, the illumination systems of FIGS. 3 and 4 may be used for illuminating symbols 24 in buttons such as button 22.

As shown in FIG. 3, a light source such as light source 34 may generate light 36. Light source 34 may be formed from one or more light-emitting diodes or other components that generate light (e.g., lamps, laser diodes, etc.). Light-emitting diodes for source 34 may have one or more colors (e.g., red, green, blue, white, yellow, etc.). As an example, light source 34 may include a first light-emitting diode with of a first color and a second light-emitting diode of a second color that is different than the first color. During operation, control circuitry 30 may control the operations of the light-emitting diodes in source 34 (e.g., to control the color of backlight illumination that is produced by source 34).

Light 36 from light source 34 may be emitted into edge 38 of light guide 40. Light guide 40 (sometimes referred to as a light guide layer) may be a transparent molded plastic light guide plate, may be formed form a flexible sheet of thin polymer (i.e., a light guide film), or may be formed form other transparent planar structures that guide light internally in accordance with the principle of total internal reflection. With one illustrative arrangement, light guide 40 is a light guide plate formed from a molded plastic such as polycarbonate or acrylic and has a thickness of 0.1 to 3 mm, more than 0.2 mm, more than 0.4 mm, more than 0.8 mm, more than 1.2 mm, less than 2 mm, less than 1 mm, or other suitable thickness.

Light 36 that has been emitted into light guide plate 40 travels laterally throughout light guide plate 40. In mixing region 56, light 38 becomes homogenized by reflecting repeatedly from the upper and lower surfaces of light guide plate 40. To extract light out of light guide plate 40 to serve as backlight for symbol 24, light guide plate 40 may have light extraction features in light extraction region 58. The light extraction features (sometimes referred to as light scattering features or light extraction structures) may be pits, grooves, or other recesses, bumps, ridges, or other protrusions, and/or printed surface patterns on the upper and/or lower surfaces of light guide plate 40. If desired, light extraction features may also be formed using internal light scattering structures such as embedded microspheres of material with an index of refraction that differs from the index of refraction of light guide plate 40, voids, or other embedded structures. In the example of FIG. 3, light extraction features 42 are downwardly protruding bumps on the lower surface of light guide plate 40. Other types of light extraction structures may be provided on light guide plate 40, if desired.

Light that is scattered upwards from features 42 creates illumination (light) 44. Light that is scattered downward may be reflected back in the upward direction by reflector 51. Reflector 51 may be a layer of white plastic, a white polymer coating (e.g., a white ink) on a printed circuit or other substrate, a reflector formed from a stack of alternating high-index-of-refraction and low-index-of-refraction dielectrics (i.e., a dielectric stack mirror coating), metal, or other reflective structures. One or more optical films (see, e.g., illustrative layers 50) may be located above light guide plate 40. Layers 50 may include, for example, a diffuser layer for diffusing illumination 44, a light collimation film (e.g., a brightness enhancement film), a colored film that imparts a desired color to illumination 44, or other suitable optical films. If desired, the functionality of one or more of these layers may be incorporated into light guide plate 24.

Illumination 44 may serve as backlight for symbol 24 or other structures in device 10. The shape of symbol 24 may be defined using an opening in a plastic or metal structure, using an opening in an opaque masking layer such as a layer of ink (white ink, black ink, gray ink, ink of other colors, etc.), or using any other suitable symbol-shaped structures. The ink in the opaque masking layer may include carbon black or other particles of pigment in a polymer binder (as an example). Masking layers based on colored dyes and other materials may also be used.

In the example of FIG. 3, opaque masking layer 46 has an opening (opening 48) with an outline (i.e., a footprint when viewed from the exterior of device 10 and housing 12) in the shape of symbol 24. Light 44 that strikes layer 46 is blocked from view by a user of device 10. Light 44 that strikes opening 48 passes through opening 48 as unblocked light 44'. Light 44' has the shape of symbol 24 (i.e., light 44' serves as illumination for symbol 24). If desired, structures may be provided above and below masking structures such as layer 46 (e.g., cover layers, supporting layers, etc.). In the example of FIG. 3, an array of capacitive touch sensor electrodes 20 have been formed under opaque masking layer 46. Electrodes 20 may be formed from metal, transparent conductive material such as indium tin oxide, metal pads with openings (e.g., an opening aligned with opening 48), metal that is sufficiently thin to be transparent, and/or conductive electrode structures of other configurations.

If desired, light diffusing structures, light collimation structures, and/or structures for conditioning light 44 may be formed as part of light guide plate 40. As shown in the illustrative configuration of FIG. 4, for example, the upper surface of light guide plate 40 may be provided with prism-shaped ridges 60 that serve as light collimation structures in light extraction region 58. Ridges 60 may run parallel to each other into the page of FIG. 4 (i.e., perpendicular to the propagation direction of light 36 from light source 34). If desired, light collimating protrusions such as ridges 60 may have other shapes and patterns. The configuration of FIG. 4 in which light collimating protrusions on light guide plate 40 have triangular cross-sectional shapes is merely illustrative.

Figure 5:
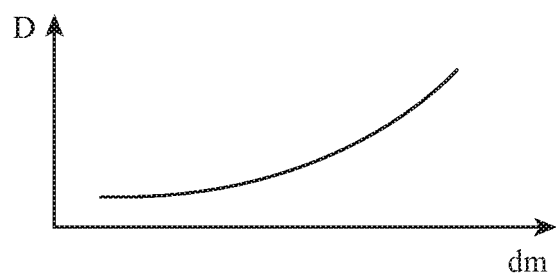
FIG. 5 is a graph showing how a light guide plate characteristic such as light-scattering feature density may vary as a function of distance across the light guide plate in accordance with an embodiment.
Figure 6:
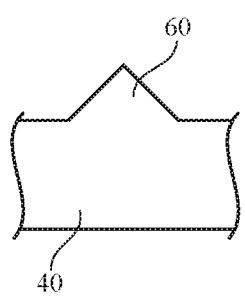
FIGS. 6, 7, and 8 are cross-sectional side views of illustrative prism-shaped ribs that may be used in forming a light collimator for a light guide plate in accordance with an embodiment.
Figure 7:
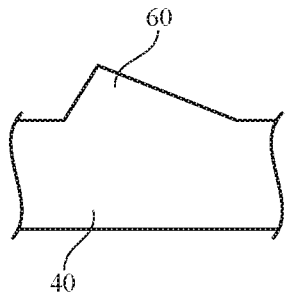
Figure 8:
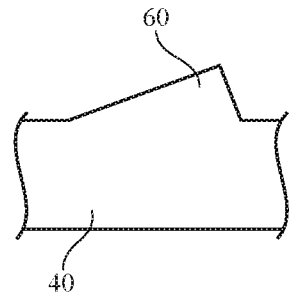

Light scattering features 42 and other structures in light guide plate 40 (e.g., light collimating structures 60) may be arranged on light guide plate 40 with a distribution that varies as a function of location across the surface of light guide plate 40. Due to the light extraction process, the intensity of light 36 may tend to decrease with increasing distance from light source 34. To counteract this decrease in the intensity of light 36 in light guide plate 40, the density D of bumps 42 or other light extraction features on light guide plate 40 may be increased with increasing distance dm from light source 34, as illustrated by the graph of FIG. 5. The density, shape, orientation, and/or other characteristics of light collimating features such as ridges 60 may also be varied as a function of location (e.g., distance dm) on light guide plate 40. As an example, some of ridges 60 may have symmetrical shapes such as the symmetrical triangular profile of FIG. 6, whereas the ridges 60 at other locations in light guide plate may have different shapes such as the asymmetrical triangular profiles of FIG. 7 and/or the asymmetrical triangular profile of FIG. 8. The shape of ridges 60 may, as an example, be progressively varied as a function of increasing distance dm from light source 34.

Figure 9:
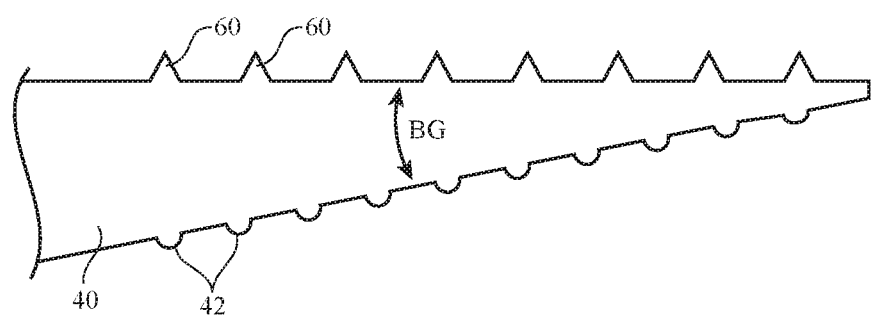
FIG. 9 is a cross-sectional side view of an illustrative light guide plate with a wedge-shaped profile in accordance with an embodiment.

Light guide plate 40 may have a thin planar shape with parallel opposing upper and lower planar surfaces as shown in FIGS. 3 and 4. If desired, light guide plate 40 and/or portions of light guide plate 40 may also have tapered shapes such as the light guide plate structure with the tapered profile shown in the cross-sectional side view of illustrative light guide plate 40 of FIG. 9. Tapered profiles such as the profile of FIG. 9 may help enhance light extraction and may be characterized by non-zero angles BG between their upper and lower planar surfaces.

Figure 10:
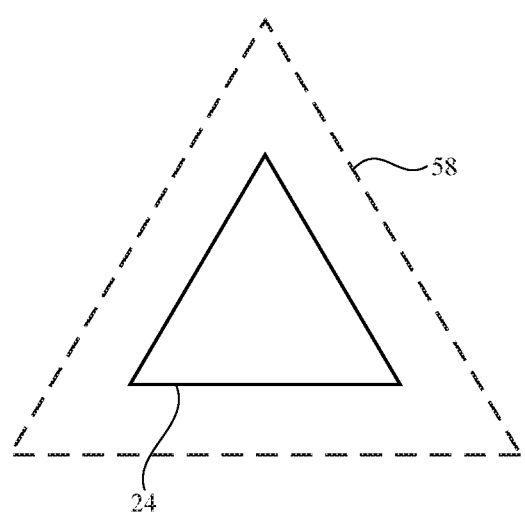
FIG. 10 is a top view of an illustrative light extraction region on a light guide plate and an associated illuminated symbol for an input-output device in accordance with an embodiment.

The shape of light extraction region 58 (i.e., the outline of region 58 when viewed from above) may be circular, rectangular, triangular, or may have other suitable shapes. The shape of light extraction region 58 may or may not match the shape of symbol 24. For example, symbol 24 may have the shape of a letter character or set of characters, whereas light extraction region 58 may have a circular or rectangular shape. As another example, symbol 24 may form a cross and light extraction region 58 may form a rectangle or may have another suitable shape that is larger than the cross. In configurations such as these, illumination 44 that is blocked by opaque masking layer 46 may not contribute to the intensity of emitted illumination 44'. To enhance illumination efficiency, light-scattering features 42 may be distributed within an area 58 that has a shape that matches the overlapping shape of symbol 24 (see, e.g., the illustrative triangular shape of light extraction region 58 in FIG. 10, which matches the triangular shape of symbol 24 and that is slightly larger than symbol 24 to facilitate alignment between symbol 24 and region 58).

Figure 11:
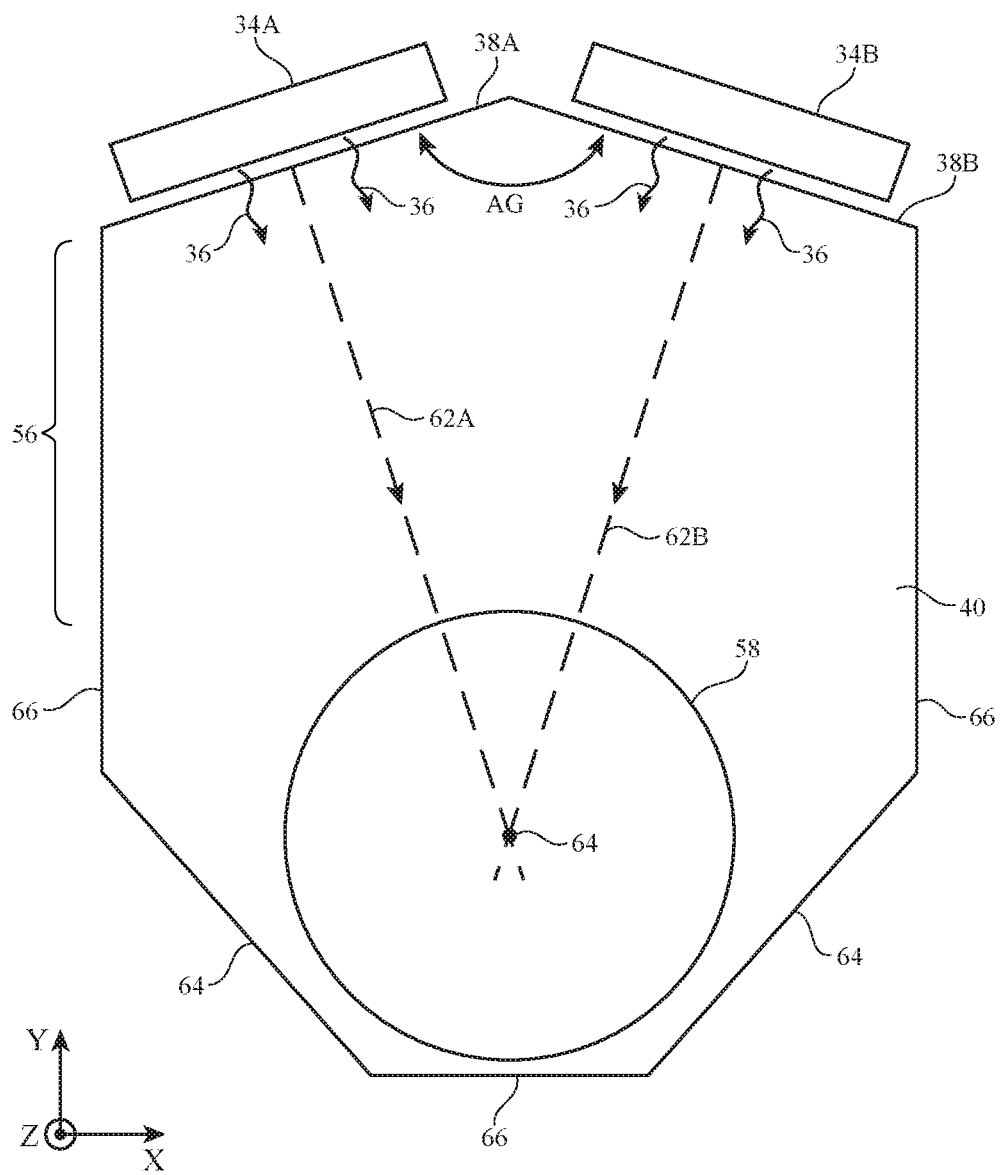
FIG. 11 is a top view of an illustrative backlight illumination system formed from a light-guide plate and associated light-emitting diodes in accordance with an embodiment.

To accommodate multiple light-emitting diodes, it may be desirable to provide light guide plate 40 with multiple angled edge surfaces each of which is oriented so that a respective light-emitting diode may emit light towards the center of region 58. An illustrative light guide plate with this type of configuration is shown in FIG. 11. As shown in FIG. 11, light guide plate 40 may be provided with light 36 from a pair of light-emitting diodes. First light-emitting diode 34A may emit light 36 into first surface 38A of light guide plate 40 and second light-emitting diode 34B may emit light 36 into second surface 38A of light guide plate 40. Edges 38A and 38B are not parallel to each other (e.g., edges 38A and 38B extend along directions that are oriented at a non-zero angle AG of 155° or other suitable non-zero angle with respect to each other). The orientation of edge surface 38A is configured so that light 36 from light-emitting diode 34 is directed along path 62A toward center 64 of light extraction area 58. The orientation of edge surface 38B is similarly configured so that light 36 from light-emitting diode 34 is directed along path 62B toward center 64 of light extraction area 58. By aligning the directions of propagation of light 36 from the first and second light-emitting diodes toward light extraction area 58, light 36 can be efficiently extracted from area 58 to serve as backlight illumination.

Light guide plate 40 may have straight sides such as edges 57 that run parallel to dimension Y (i.e., roughly parallel to the direction of propagation of light 36 exiting light-emitting diodes 34A and 34B). Light 36 that strikes edges 57 at a glancing angle will be reflected further along dimension Y. At the end of light guide plate 40 opposing the end of light guide plate 40 with light-emitting diodes 34A and 34B, edges 64 of light guide plate 40 may be oriented at 45° angles or other suitable angles to facilitate light recycling. Light 36 that is propagating in the −Y direction of FIG. 11 and that is not extracted in region 58 may strike one of angled edges 64. The 45° orientation of edges 64 with respect to light propagation dimension −Y causes light 36 that strikes a given edge 64 to reflect along the X dimension toward the other edge 64 and thereafter to reflect back in the +Y direction. The angled edges 64 at the lower end of light guide plate 40 of FIG. 11 therefore serve as a retroreflector that helps recycle light 36 back into light guide plate for extraction by the light extraction features of region 58.

In the example of FIG. 11, there are two different light-emitting diodes that provide light 36 to light guide plate 40. If desired, there may be one or more, two or more, three or more, or four or more different light-emitting diodes that provide light to light guide plate 40. The light-emitting diodes may all be of the same color or may each emit light with a different color. In configurations in which two or more of the light-emitting diodes emit light of different colors, the color of illumination 44 may be controlled by circuitry 30 by adjusting the relative proportion of light emitted by each of the diodes.

In addition to or instead of using a retroreflector structure to enhance light recycling, some or all of the edges of light guide plate 40 may be provided with a metal or plastic reflective coating that reflect light 36 back into plate 40 rather than allowing light 36 to escape from the edges of plate 40.

Figure 12:
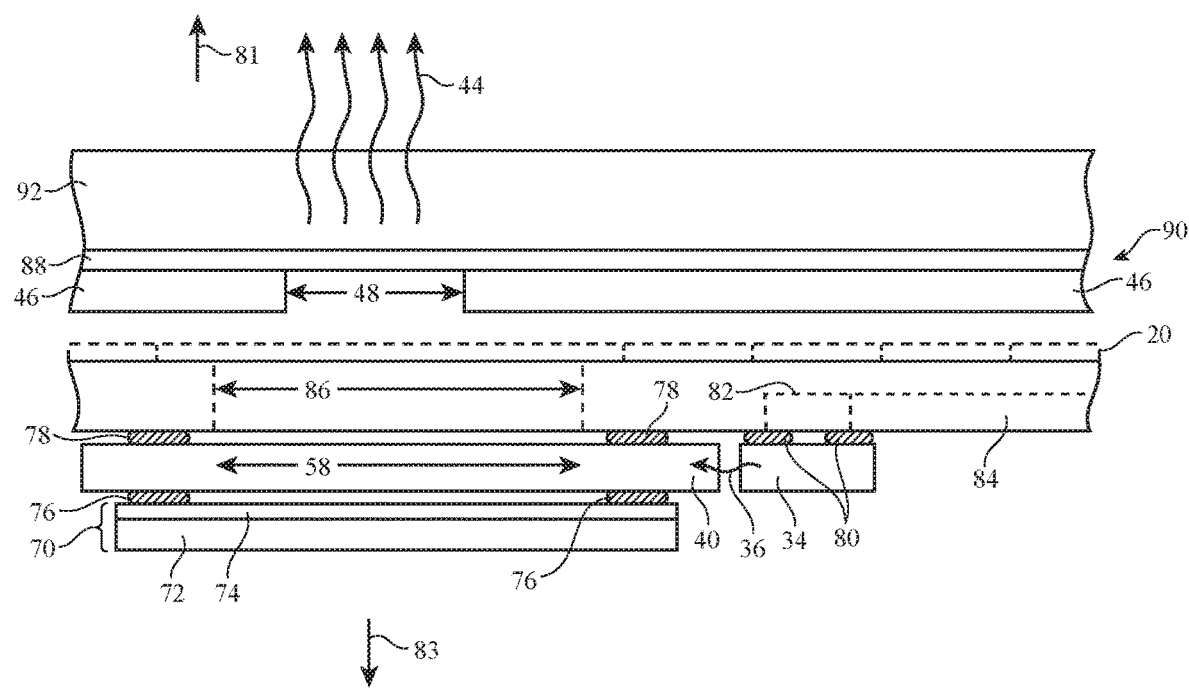
FIG. 12 is a cross-sectional side view of an illustrative backlight illumination system formed using a light guide plate mounted on the underside of a printed circuit in alignment with an opening in the printed circuit in accordance with an embodiment.

FIG. 12 is a cross-sectional side view of an illustrative illumination system of the type that may be used to illuminate a symbol for a button such as button 22 or that may provide illumination elsewhere in device 10. As shown in FIG. 12, light source 34 (e.g., one or more light-emitting diodes) may emit light 36 into light guide plate 40. Light guide plate 40 may be mounted under printed circuit 84. Printed circuit 84 may have an opening such as opening 86 (e.g., a circular opening, a rectangular opening, etc.) that overlaps light extraction region 58. Opening 86 may, for example, be the same size as region 58 or may be larger than region 58.

Light guide plate 40 may have light extraction features in light extraction region 58 that create illumination 44. Illumination (light) 44 may travel upward in direction 81 through opening 86 in printed circuit 84. Illumination 44 that is scattered out of region 58 in downward direction 83 may be reflected back in upward direction 81 by reflector 70.

Reflector 70 may include a reflective layer such as layer 74 on a support structure such as substrate 72. Substrate 72 may be formed from plastic, metal, or other suitable material. Reflector 70 may be formed from white polymer (white ink), a dielectric stack mirror coating, metal, or other reflective material. With one illustrative configuration, substrate 72 may be a layer of printed circuit material (e.g., a rigid printed circuit substrate or a flexible printed circuit substrate) and reflective layer 74 may be a white reflective layer (white coverlay) on the surface of the printed circuit substrate.

Adhesive 76 (e.g., a ring of adhesive that runs around the peripheral edge of reflector 70) may be used in attaching reflector 70 to the lower surface of light guide plate 40. Light guide plate 40 may be attached to printed circuit 84 by a ring of adhesive such as adhesive 78. Adhesive 78 may run along the periphery of opening 86 (i.e., adhesive 78 may have the shape of a ring that surrounds opening 86). If desired, reflector 70 may be attached to light guide plate (light guide layer) 40 using screws, clamps, or other attachment structures and light guide plate 40 may be attached to printed circuit 84 using screws, clamps, or other attachment structures. The use of adhesive 76 and 78 to attach light guide plate between reflector 70 and printed circuit 84 is illustrative.

Printed circuit 84 may be a rigid printed circuit board or other printed circuit with interconnects formed from metal traces 82. Light-emitting diodes such as diode 34 of FIG. 12 may be attached to traces 82 using solder 80. If desired, metal traces or other conductive traces 82 on the upper surface of printed circuit 84 or elsewhere in printed circuit 84 may be used in forming an array of capacitive electrodes for a touch sensor (i.e., capacitive touch sensor electrodes 20). Electrodes 20 may have the shape of a grid of lines (e.g., drive lines that run across printed circuit 84 along one dimension and sense lines that run across printed circuit 84 along a perpendicular dimension), may have the shapes of strips of metal, or may form an array of pads or other touch sensor patterns. In the example of FIG. 2, touch sensor electrodes 20 have been formed on the upper surface of the same printed circuit substrate to which light-emitting diode 34 is mounted. This is merely illustrative. Touch sensor electrodes 20 may be formed on a separate substrate (e.g., a separate flexible printed circuit or rigid printed circuit, the underside of a cover layer, a molded plastic support, etc.) or elsewhere in device 10. One or more of touch sensor electrodes 20 may be monitored for touch input and may therefore serve as an input device such as button 22 of FIG. 1 that is aligned with symbol 24. If desired, a button such as button 22 that is labeled with illuminated symbol 24 may have components for receiving user input without using an electrode 20 or in addition to using an electrode 20 (e.g., a collapsible dome switch or other switch that can be depressed by a user, a force sensor, a light-based proximity sensor, etc.), other input-output devices 32 or portions of housing 12 may be provided with illuminated symbols 24, etc.

Cover layer 92 may form a part of housing 12, may be part of a clear layer mounted within surrounding opaque structures (e.g., opaque metal or plastic housing structures), or may be any other suitable structure within device 10. Layer 92 may be transparent or may have a region overlapping light guide plate 40 that is transparent (e.g., translucent, clear, or colored with sufficient transmissivity to allow light 44 to pass, etc.). Opaque masking materials such as opaque masking layer 46 or other light masking structures may be interposed between light guide plate 40 and cover layer 92 to pattern light 44.

As shown in FIG. 12, layer 46 may have an opening such as opening 48. The shape of opening 48 may be configured to pattern light 44 into the shape of a desired symbol (e.g., symbol 24 of FIG. 1, etc.). Layer 46 may be formed from a layer of black ink (e.g., a polymer with carbon black particles, a polymer with particles of other colors, etc.) or other opaque material that blocks visible light. The thickness of layer 46 may be 1-100 microns, more than 0.5 microns, or less than 50 microns (as examples).

To provide the exterior of device 10 with a desired appearance, it may be desirable to coat the underside of cover layer 92 with a thin layer of cosmetic ink such as cosmetic ink 88. Ink 88 may be white ink (e.g., polymer containing titanium dioxide particles) or may be ink of other colors (black ink, gray ink, blue, red, or green ink, etc.). The thickness of ink 88 may be 0.1 to 100 microns, more than 1 micron, or less than 50 microns (as examples). Ink layer 88 may be configured so as to be sufficiently transparent to allow light 44 to escape from device 10 while being sufficiently opaque to block internal components in device 10 from view. With one illustrative configuration, the transmissivity of layer 88 may be 2-6%, may be more than 1%, may be less than 10%, etc. The transmissivity of layer 46 in this type of arrangement may be less than 1% or other amount less than the transmissivity of layer 88 (as an example).

If desired, layer 92 may form part of the outermost surface of housing 12 and device 10 (e.g., layer 92 may form part of housing 12). As another example, layer 92 may be an internal structure that is used as a support for patterned ink layers or other coating layers 90 (e.g., opaque layer 46 and cosmetic layer 88 or other coatings on layer 46). All of layer 92 may be transparent or the portions of layer 92 that overlap symbol 24 (i.e., opening 48) may be transparent. If desired, additional layer(s) of material that are sufficiently transparent to allow light 44 to exit device 10 may be stacked with layer 92 and/or the other layers of FIG. 12.

Figure 13:
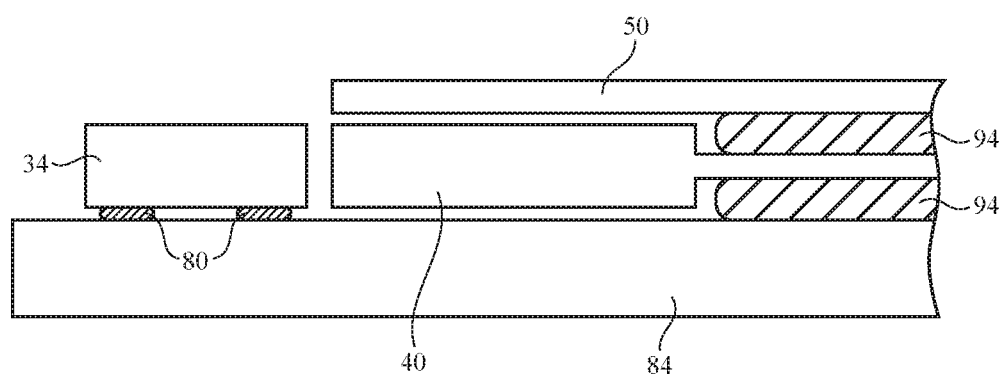
FIG. 13 is a cross-sectional side view of an illustrative light guide plate with notches to accommodate adhesive and light guide plate in accordance with an embodiment.

FIG. 13 is a cross-sectional side view of an illustrative illumination system in which light guide plate 40 has been provided with notches to receive adhesive 94. Adhesive 94 may be used in attaching optical layer 50 over the surface of light guide plate 40 and may be used in attaching light guide plate 40 to printed circuit 84 in flush configurations. Optical layer 50 may be a diffuser, brightness enhancement film, and/or other optical layer. Light-emitting diode 34 may be attached to the surface of printed circuit 84 using solder 80.

In the example of FIG. 12, light guide plate 40 is attached to the inner surface of printed circuit 84 and a touch sensor is formed from electrodes 20 on the opposing outer surface of printed circuit 84. This type of configuration may sometimes be referred to as an underside mounting configuration or reverse mounting configuration. If desired, light guide plate 40 may be mounted to the outermost surface of a printed circuit or other support structure (i.e., in an topside mounting configuration). The example of FIG. 12 is presented as an example.

The foregoing is merely illustrative and various modifications can be made by those skilled in the art. The foregoing embodiments may be implemented individually or in any combination.

What is claimed is:

1. An illuminated input device comprising: a transparent structure; an input device; opaque material on the transparent structure and having a symbol-shaped opening that forms a label for the input device; and an illumination system that provides illumination for the input device, wherein the illumination system has at least one light-emitting diode that emits light into a light guide plate, wherein the light guide plate comprises a light extraction region with light collimation structures and a mixing region without the light collimation structures, wherein the light extraction region is overlapped by the label and the mixing region is overlapped by the opaque material, wherein the light guide plate guides the light from the mixing region to the light extraction region via total internal reflection, and wherein the light exits the light guide plate via the light collimation structures and passes through the symbol-shaped opening and the transparent structure.

2. The illuminated input device defined in claim 1 wherein the light guide plate has at least two edges that are oriented at a non-zero angle with respect to each other, wherein the at least one light-emitting diode includes first and second light emitting diodes, wherein the first light-emitting diode emits light into a first of the two edges of the light guide plate, and wherein the second light-emitting diode emits light into a second of the two edges of the light guide plate.

3. The illuminated input device defined in claim 2 further comprising light extraction bumps on the light guide plate.

4. The illuminated input device defined in claim 3 wherein the bumps are located in the light extraction region of the light guide plate.

5. The illuminated input device defined in claim 4 wherein the light collimation structures comprise a plurality of parallel ribs on a first surface of the light guide plate and wherein the bumps protrude from an opposing second surface of the light guide plate.

6. The illuminated input device defined in claim 1 further comprising a printed circuit to which the at least one light-emitting diode is soldered.

7. The illuminated input device defined in claim 6 wherein the printed circuit has an opening through which the illumination passes.

8. The illuminated input device defined in claim 7 further comprising adhesive that attaches the light guide plate to the printed circuit so that the light extraction region in the light guide plate overlaps the opening in the printed circuit.

9. The illuminated input device defined in claim 1 wherein the opaque material comprises ink.

10. The illuminated input device defined in claim 9 wherein the input device comprises at least one capacitive touch sensor electrode.

11. The illuminated input device defined in claim 1 wherein the light guide plate has a wedge-shaped profile.

12. The illuminated input device defined in claim 1 wherein the light guide plate has two edges that are oriented at a non-zero angle with respect to each other.

13. The illuminated input device defined in claim 1 further comprising a printed circuit having a reflective layer, wherein the printed circuit with the reflective layer is attached to the light guide plate with adhesive and reflects light from the light guide plate back towards the light guide plate.

14. The illuminated input device defined in claim 1 further comprising a diffuser interposed between the symbol-shaped opening and the light guide plate.

15. An illuminated input device comprising: an input device; an opaque layer on a transparent structure and having a symbol-shaped opening that forms a label for the input device; a light guide layer that overlaps the input device, wherein the light guide layer has a mixing region overlapping the opaque layer, a light extraction region with protrusions overlapping the symbol-shaped opening of the input device and first and second edges oriented at a non-zero angle with respect to each other; and first and second light-emitting diodes of different colors that emit light respectively into the first and second edges, wherein the first and second light-emitting diodes emit the light respectively along first and second paths that intersect at the light extraction region, and wherein the light guide layer guides the light from the mixing region to the light extraction region via total internal reflection such that the light is scattered out of the light guide layer by the protrusions in the light extraction region to pass through the symbol-shaped opening and the transparent structure.

16. The illuminated input device defined in claim 15 further comprising parallel molded ridges on the light guide layer that collimate the light scattered by the protrusions.

17. The illuminated input device defined in claim 16 wherein the light guide layer further comprises third and fourth edges that are oriented at a non-zero angle with respect to each other and wherein the third and fourth edges form a retroreflector that recycles light within the light guide layer.

18. An illuminated input device comprising:
   an opaque layer on a transparent structure and having a symbol-shaped opening;
   at least one capacitive touch sensor electrode associated with the symbol-shaped opening, wherein the at least one capacitive touch sensor electrode forms an input device that is labeled by the symbol-shaped opening;
   a light guide plate having a mixing region that overlaps the opaque layer and a light extraction region having protrusions that overlap with the symbol-shaped opening; and
   a light source that emits light into the light guide plate, wherein the light is guided from the mixing region to the light extraction region via total internal reflection and is scattered out of the light guide plate by the protrusions in the light extraction region to pass through the symbol-shaped opening in the opaque layer and the transparent structure.

19. The illuminated input device defined in claim 18 further comprising: a layer of ink that covers the transparent layer and that has a transmissivity of at least 1%, wherein the layer of ink is interposed between the opaque layer and the transparent layer.

20. The illuminated input device defined in claim 18 wherein the light guide plate has a side with molded ribs that collimate the light scattered out of the light guide plate and wherein the protrusions are located on an opposing side of the light guide plate in the light extraction region.

\* \* \* \* \*